US009185527B2

(12) United States Patent
Chiu et al.

(10) Patent No.: US 9,185,527 B2
(45) Date of Patent: Nov. 10, 2015

(54) SYSTEM, SERVER AND METHOD CAPABLE OF DISPLAYING USER STATUS

(71) Applicant: HON HAI PRECISION INDUSTRY CO., LTD., New Taipei (TW)

(72) Inventors: Kuan-Jung Chiu, New Taipei (TW); Han-Fang Tu, New Taipei (TW); Mei-Ju Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 184 days.

(21) Appl. No.: 14/060,605

(22) Filed: Oct. 22, 2013

(65) Prior Publication Data

US 2014/0256363 A1 Sep. 11, 2014

(30) Foreign Application Priority Data

Mar. 11, 2013 (TW) .............................. 102108426 U

(51) Int. Cl.
| | | |
|---|---|---|
| *H04W 4/02* | (2009.01) | |
| *G08G 1/01* | (2006.01) | |
| *G08G 1/00* | (2006.01) | |
| *H04L 29/08* | (2006.01) | |
| *G01C 21/34* | (2006.01) | |

(52) U.S. Cl.
CPC .............. *H04W 4/027* (2013.01); *G08G 1/0104* (2013.01); *G08G 1/20* (2013.01); *G01C 21/3438* (2013.01); *H04L 67/28* (2013.01)

(58) Field of Classification Search
CPC ........ H04W 4/027; G08G 1/104; G08G 1/20; G01C 21/3438; H04L 67/28
See application file for complete search history.

(56) References Cited

U.S. PATENT DOCUMENTS

| | | | |
|---|---|---|---|
| 5,604,676 A | 2/1997 | Penzias | |
| 9,047,765 B2 * | 6/2015 | Sutardja | ................................. 1/1 |
| 2009/0005018 A1 * | 1/2009 | Forstall et al. | ............. 455/414.1 |
| 2009/0033515 A1 * | 2/2009 | Cavanaugh | .............. 340/825.49 |
| 2009/0097414 A1 * | 4/2009 | Yoon et al. | ...................... 370/254 |
| 2010/0023964 A1 * | 1/2010 | Basso et al. | ...................... 725/32 |
| 2010/0201545 A1 | 8/2010 | Narea et al. | |
| 2013/0085861 A1 * | 4/2013 | Dunlap | ....................... 705/14.58 |
| 2014/0143351 A1 * | 5/2014 | Deng | ............................. 709/206 |

FOREIGN PATENT DOCUMENTS

CN 101123515 A 2/2008

* cited by examiner

*Primary Examiner* — Mehmood B Khan
(74) *Attorney, Agent, or Firm* — Novak Druce Connolly Bove + Quigg LLP

(57) ABSTRACT

A server includes a communication module, a database and a processor. The communication module receives identification information of a user of a mobile terminal and a movement status and a geographic position of the user from the mobile terminal. The processor determines real time traffic condition of the geographic position of the user according to the real time traffic information of the area where the user is located stored in the database and evaluates a time period to be spent from the geographic position of the user to the display terminal according to the movement status of the user and the real time traffic condition of the area. The communication module further transmits the geographic position of the user, the evaluated time period and the identification information of the user to the display terminal. A system including the server and a method of displaying a user status are also disclosed.

9 Claims, 3 Drawing Sheets

SYSTEM, SERVER AND METHOD CAPABLE OF DISPLAYING USER STATUS

BACKGROUND

1. Technical Field

The present disclosure relates to a system, a server and a method capable of displaying a user status.

2. Description of Related Art

People call or send messages to other people via phones to ask location and arrival time. However, the asked person may in a situation in which it is inconvenient to answer the phone, for example, driving a car.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the views.

DETAILED DESCRIPTION

Figure 1:
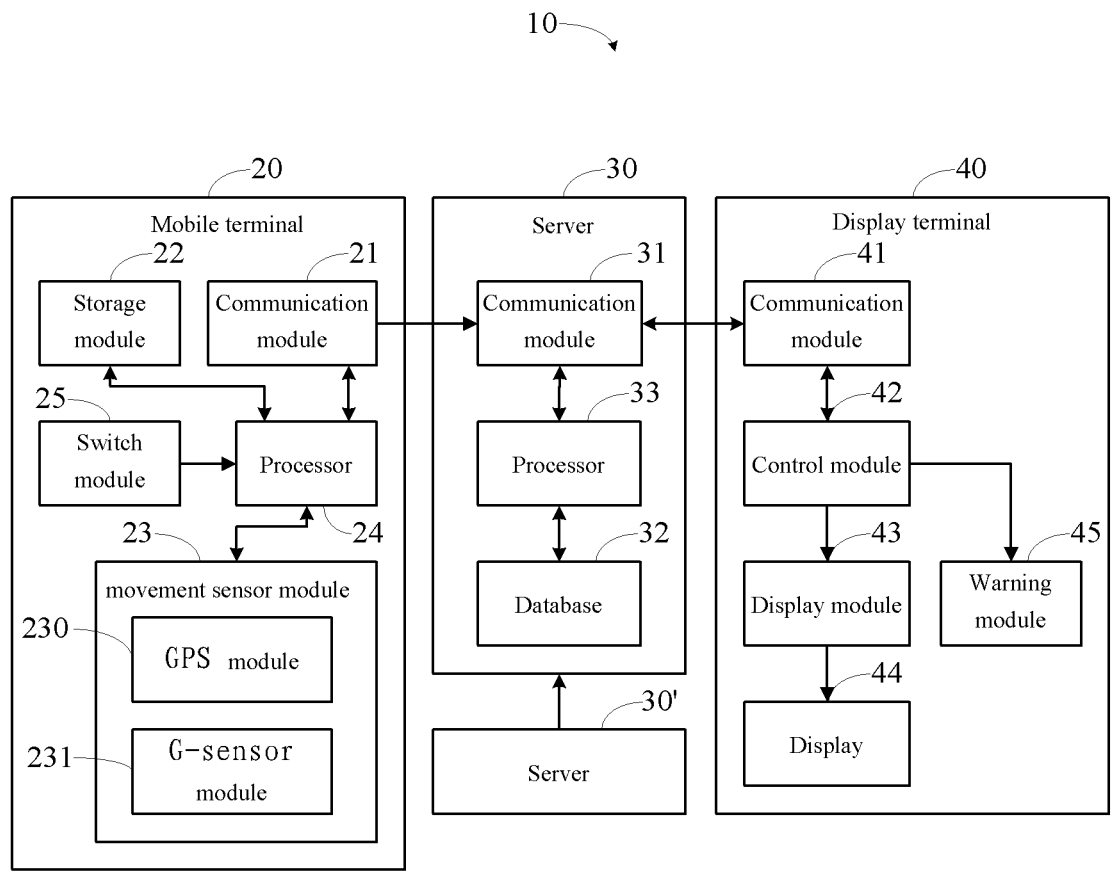
FIG. 1 is a block diagram of a system of displaying a user's status.

FIG. 1 is a system 10 according to an exemplary embodiment. The system 10 could be one of the following systems but not limited only to the following, computer, server, network, for example. The system 10 includes at least one mobile terminal 20, a server 30 and at least one display terminal 40 corresponding to the at least one mobile terminal 20. The at least one mobile terminal 20 and the at least one display terminal 40 communicate with the server 30.

Each of the at least one mobile terminal 20 includes a communication module 21, a storage module 22, a movement sensor module 23 and a processor 24.

The storage module 22 is configured to store identification information of a user of the mobile terminal 20 and identification information of the display terminal 40. The identification information of the user may be a name of the user. The identification information of the display terminal 40 may be a network address of the display terminal 40. In an alternative embodiment, the identification information of the display terminal 40 may be a phone number assigned to the display terminal.

The movement sensing module 23 is configured to sense a movement status of the user and determine a geographic position of the user. In the exemplary embodiment, the movement sensor module 23 includes a GPS (global positioning system) module 230 and a G-sensor (acceleration sensor) module 231. The GPS module 230 is configured to determine the geographic position of the user. The G-sensor module 231 is configured to sense the movement status of the user. The movement status includes a movement speed.

The processor 24 is configured to actuate the movement sensor module 23 and generate the user's information. The user's information includes the identification information of the user of the mobile terminal 20, the identification information of the display terminal 40 corresponding to the mobile terminal 20, and the movement status and the geographic position of the user. In the exemplary embodiment, the mobile terminal 20 further includes a switch module 25 operable by the user. The switch module 25 is a mechanical key or a touch key. The processor 24 actuates the movement sensor module 23 in respond to the operation on the switch module 25. In an alternative embodiment, the processor 24 automatically periodically actuates the movement sensor module 23.

The communication module 21 is configured to transmit the user's information to the server 30.

The server 30 includes a communication module 31, a database 32 and a processor 33.

The database 32 is configured to store real time traffic information of a number of areas. The real time traffic information of the areas are provided by a server 30' communicating with the server 30. In the exemplary embodiment, the server 30' is a monitor for monitoring the areas to obtain the real time traffic information of the areas. The database 32 is further configured to preliminarily store geographic positions of each of the at least one display terminal 40.

The communication module 31 is configured to receive the user's information transmitted from the mobile terminal 20.

The processor 33 is configured to determine real time traffic condition the geographic position of the user according to real time traffic information of the area where the user is located. The processor 33 is further configured to determine the display terminal 40 according to the identification information of the display terminal 40 and the geographic position of the display terminal 40. In addition, evaluate a time period to be spent from the position of the user to the geographic position of the display terminal 40 according to the movement status of the user and the real time traffic condition of the area.

The communication module 31 is further configured to transmit the geographic position of the user, the evaluated time period and the identification information of the user to the display terminal 40.

The display terminal 40 includes a communication module 41, a control module 42, a display module 43 and a display 44.

The communication module 41 is configured to receive the geographic position of the user, the evaluated time period and the identification information of the user transmitted from the server 30.

The control module 42 is configured to control the display 44 to provide a display window 46 when the communication module 41 receives the geographic position of the user, the evaluated time period and the identification information of the user.

The display module 43 is configured to display the geographic position of the user, the evaluated time period and the identification information of the user on the display window 46.

Figure 2:
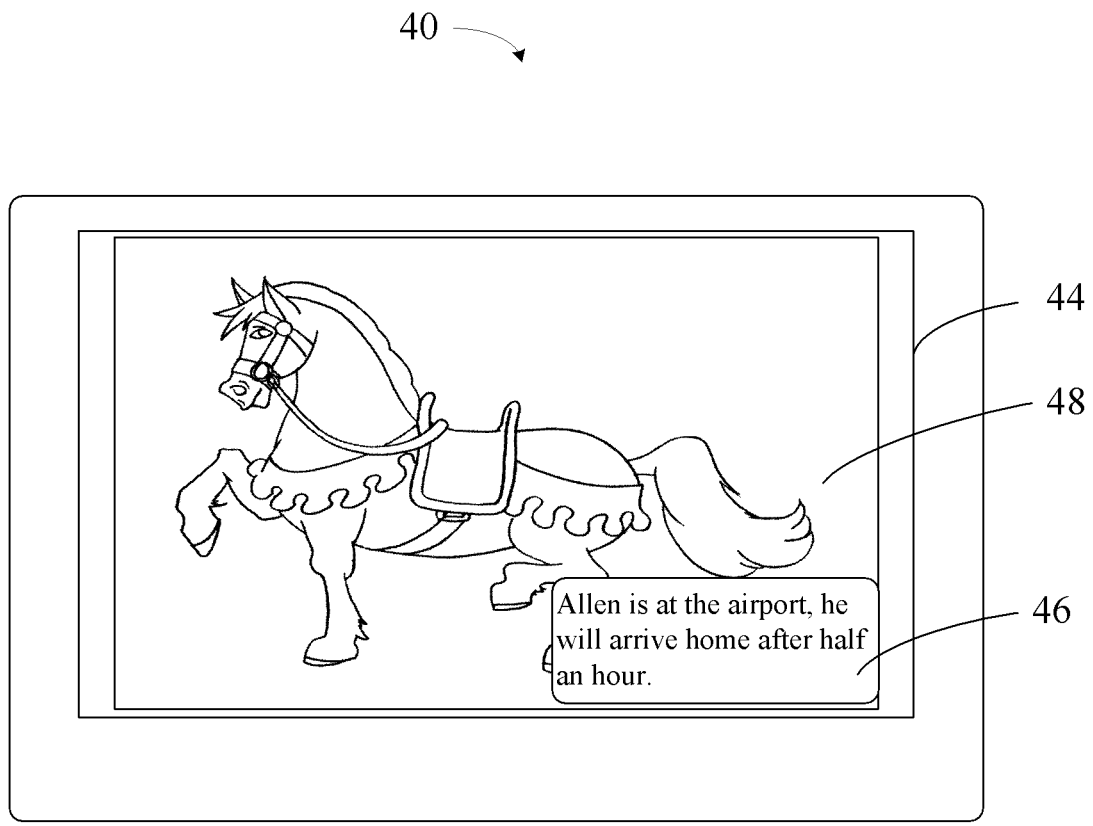
FIG. 2 is a schematic view of a display terminal with a user's status displayed thereon.

FIG. 2 shows that the display terminal 40 is a television. In other embodiments the display terminal could be other devices designed to display images. The control module 42 is further configured to control the display 44 to provide a video window 48 for displaying television programs. The display window 16 is overlaid on the video window 48 and the area of the display window 46 is smaller than that of the video window 48.

In the exemplary embodiment, the database 32 is further configured to store a reference movement status. The processor 33 is further configured to compare the movement status transmitted from the mobile terminal 20 to the reference movement status to determine whether the user is in a normal status. For example, the reference movement status includes a reference speed. When the difference between the reference speed and the movement speed of the movement status falls in a preset range, the processor 33 determines the user is in a normal status, and transmits the geographic position of the user, the evaluated time period and the identification information of the user to the display terminal 40. When the difference between the reference speed and the movement speed of the movement status falls beyond the preset range, the processor 33 determines the user is in an abnormal status and generates a warning signal, and transmits the warning signal, the geographic position of the user, the evaluated time period, and the identification information of the user to the display terminal 40. The display terminal 40 further includes a warning module 45. The control module 42 is further configured to control the warning module 45 to alert a user in front of the display terminal in response to the warning signal.

Figure 3:
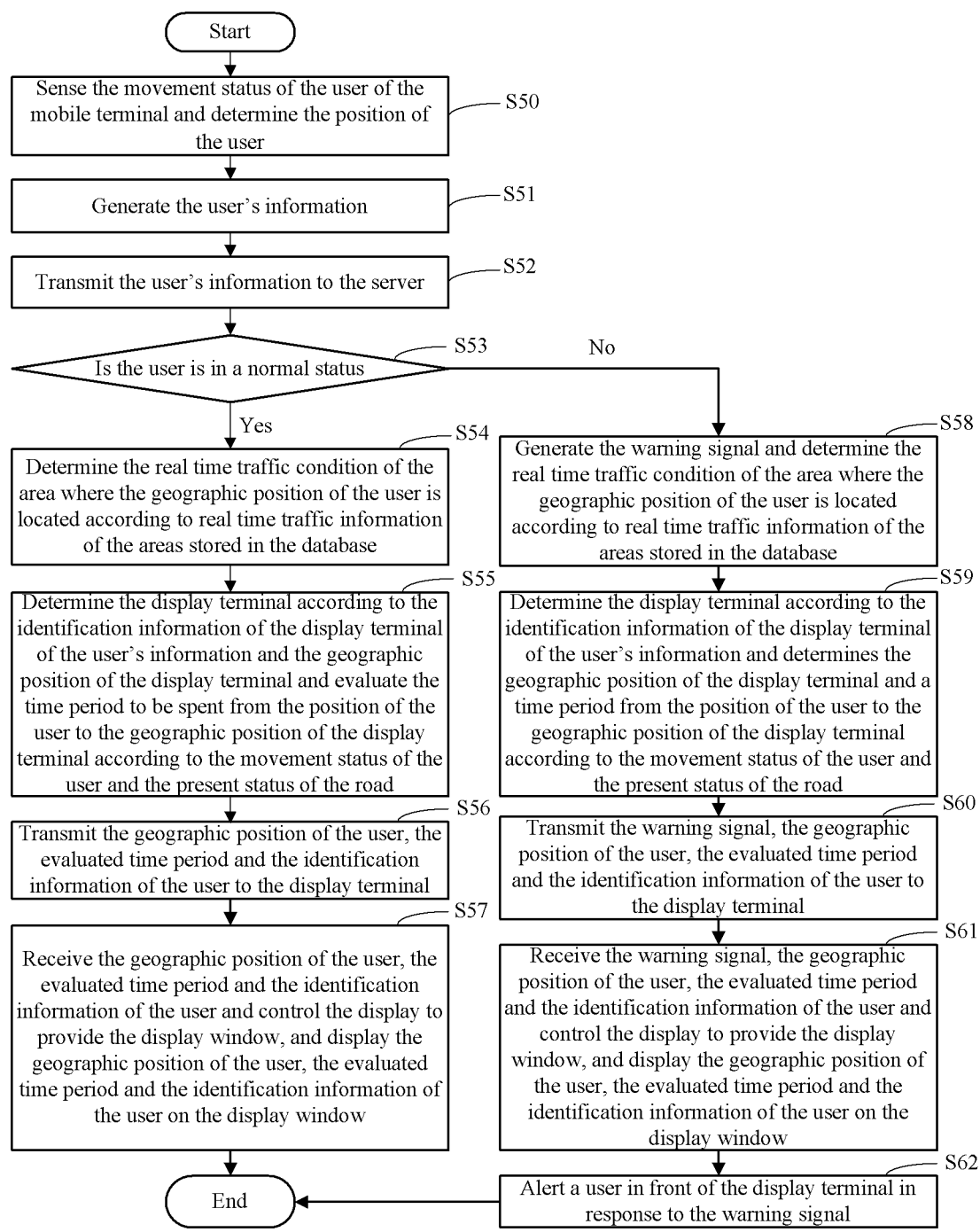
FIG. 3 is a flowchart of a method of displaying a user's status.

FIG. 3 is a flowchart of a method of displaying a user status.

In step S50, the processor 24 actuates the movement sensor module 23 to sense the movement status of the user of the mobile terminal 20 and determine the geographic position of the user. The movement status includes the movement speed. In the exemplary embodiment, the processor 24 actuates the movement sensor module 23 in respond to the user's operation on the switch module 25 operable by the user. In an alternative embodiment, the processor 24 automatically periodically actuates the movement sensor module 23.

In step S51, the processor 24 generates the user's information. The user's information includes the identification information of the user of the mobile terminal 20, the identification information of the display terminal 40 corresponding to the mobile terminal 20, and the movement status and the geographic position of the user.

In step S52, the communication module 21 transmits the user's information to the server 30.

In step S53, the communication module 31 receives the user's information and compares the movement status of the user's information to the reference movement status to determine whether the user is in a normal status. If the user is in a normal status, the process goes to step S54. Otherwise, the process goes to step S60.

In step S54, the processor 33 determines the real time traffic condition of the area where the geographic position of the user is located according to real time traffic information of the areas stored in the database 32.

In step S55, the processor 33 determines the display terminal 40 according to the identification information of the display terminal 40 of the user's information and the geographic position of the display terminal 40 according to the geographic position of each display terminal 40 preliminarily stored in the database 32. In addition, evaluates the time period to be spent from the position of the user to the geographic position of the display terminal 40 according to the movement status of the user and the real time traffic condition of the area.

In step S56, the communication module 31 transmits the geographic position of the user, the evaluated time period and the identification information of the user to the display terminal 40.

In step S57, the communication module 41 receives the geographic position of the user, the evaluated time period and the identification information of the user. In addition, the control module 42 controls the display 44 to provide the display window, and the display module 43 displays the geographic position of the user, the evaluated time period and the identification information of the user on the display window 46.

In step S58, the processor 33 generates the warning signal and determines the real time traffic condition of the area where the geographic position of the user is located according to real time traffic information of the areas stored in the database 32.

In step S59, the processor 33 determines the display terminal 40 according to the identification information of the display terminal 40 of the user's information and determines the geographic position of the display terminal 40 according to the geographic position of each display terminal 40 preliminarily stored in the database 32. In addition, evaluates the time period to be spent from the position of the user to the geographic position of the display terminal 40 according to the movement status of the user and the present status of the road.

In step S60, the communication module 31 transmits the warning signal, the geographic position of the user, the evaluated time period and the identification information of the user to the display terminal 40.

In step S61, the communication module 41 receives the warning signal, the geographic position of the user, the evaluated time period and the identification information of the user and the control module 42 controls the display 44 to provide the display window 46, and the display module 43 displays the geographic position of the user, the evaluated time period and the identification information of the user on the display window 46.

In step S62, the control module 42 controls the warning module 25 to alert a user in front of the display terminal in response to the warning signal.

It is to be understood, however, that even though numerous characteristics and advantages of the present disclosure have been set fourth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A system comprising a mobile terminal, a display terminal corresponding to the
   mobile terminal and a server communicating with the mobile terminal and the display terminal,
   the mobile terminal comprising:
   a storage module configured to store identification information of a user of the mobile terminal and identification information of the display terminal corresponding to the mobile terminal;
   a movement sensor module configured to sense a movement status of the user and determine a geographic position of the user;
   a processor configured to generate the user's information, the user's information comprising the identification information of the user of the mobile terminal, the identification information of the display terminal corresponding to the mobile terminal and the movement status and the geographic position of the user;
   a communication module configured to transmit the identification information of the user of the mobile terminal, the identification information of the display terminal corresponding to the mobile terminal and the movement status and the geographic position of the user to the server; and
   the server comprising:
   a communication module configured to receive the identification information of the user of the mobile terminal, the identification information of the display terminal corresponding to the mobile terminal and the movement status and the geographic position of the user from the mobile terminal;

a database configured to store real time traffic information of a plurality of areas;

a processor configured to determine real time traffic condition of the geographic position of the user according to the real time traffic information of the area where the user is located and evaluate a time period to be spent from the geographic position of the user to the display terminal according to the movement status of the user and the real time traffic condition of the area;

the communication module further configured to transmit the geographic position of the user, the evaluated time period and the identification information of the user to the display terminal;

the display terminal configured to display the geographic position of the user, the evaluated time period and the identification information of the user transmitted from the server;

wherein the database is further configured to store a reference movement status, and the processor of the server is further configured to compare the movement status transmitted from the mobile terminal to the reference movement status to determine whether the user is in a normal status;

wherein the reference movement status includes a reference speed, when the difference between the reference speed and a movement speed of the movement status falls in a preset range, the processor of the server determines the user is in a normal status, when the difference between the reference speed and the movement speed of the movement status falls beyond the preset range, the processor of the server determines the user is in an abnormal status.

2. The system as described in claim 1, wherein the processor of the server transmits the geographic position of the user, the evaluated time period and the identification information of the user to the display terminal when the user in a normal status.

3. The system as described in claim 1, wherein the processor of the server generates a warning signal, and transmits the warning signal, the geographic position of the user, the evaluated time period and the identification information of the user to the display terminal when the user in an abnormal status.

4. The system as described in claim 3, wherein the display terminal is further configured to alert a user in front of the display terminal in response to the warning signal.

5. The system as described in claim 1, wherein the mobile terminal further includes a switch module operable by the user, the processor is further configured to actuate the movement sensor module in response a user's operation on the switch module.

6. A server for communicating with a mobile terminal and a display terminal associated with the mobile terminal, the mobile terminal configured to sense a movement status of a user of the mobile terminal and determine a geographic position of the user, the server comprising:

a communication module configured to receive identification information of the user of the mobile terminal, identification information of the display terminal and the movement status and the geographic position of the user from the mobile terminal;

a database configured to store real time traffic information of a plurality of areas;

a processor configured to determine real time traffic condition of the geographic position of the user according to the real time traffic information of the area where the user is located and evaluate a time period to be spent from the geographic position of the user to the display terminal according to the movement status of the user and the real time traffic condition of the area;

the communication module further configured to transmit the geographic position of the user, the evaluated time period and the identification information of the user to the display terminal;

wherein the database is further configured to store a reference movement status, and the processor is further configured to compare the movement status transmitted from the mobile terminal to the reference movement status to determine whether the user is in a normal status;

wherein the reference movement status includes a reference speed and a reference direction, when the difference between the reference speed and a movement speed of the movement status falls in a preset range, the processor of the server determines the user is in a normal status, when the difference between the reference speed and the movement speed of the movement status falls beyond the preset range, the processor of the server determines the user is in an abnormal status.

7. The server as described in claim 6, wherein the processor transmits the position of the user, the evaluated time and the identification information of the user to the display terminal when the user in a normal status.

8. The server as described in claim 6, wherein the processor generates a warning signal, and transmits the warning signal, the geographic position of the user, the evaluated time period and the identification information of the user to the display terminal when the user is in an abnormal status.

9. A method of displaying a user's status comprising:

detecting a movement status of a user of a mobile terminal; and determining a geographic position of the user;

storing identification information of a user of the mobile terminal and identification of a display terminal corresponding to the mobile terminal;

generating user's information comprising identification information of the user of the mobile terminal, identification information of the display terminal corresponding to the mobile terminal, and the movement status and the geographic position of the user;

transmitting the user's information to a server;

determining a real time traffic condition of an area where the geographic position of the user is located according to real time traffic information of a plurality of areas stored in a database and evaluating a time period to be spent from the geographic position of the user to the display terminal according to the movement status of the user and the real time traffic condition of the area;

comparing a movement speed of the movement status of the user's information to a reference speed comprised in a reference movement status;

determining that the user is in a normal status if the difference between the reference speed and the movement speed of the movement status of the user's information falls in a preset range;

transmitting the geographic position of the user, the evaluated time period and the identification information of the user to the display terminal associated with the mobile terminal, if the user is in the normal status;

displaying the geographic position of the user, the evaluated time period and the identification information of the user transmitted from the server on the display terminal associated with the mobile terminal;

determining that the user is in an abnormal status if the difference between the reference speed and the movement speed of the movement status of the user's information falls beyond the preset range;

generating a warning signal if the user is in the abnormal status and transmitting the warning signal to the display terminal; and alerting a user in front of the display terminal using the display terminal in response to the warning.

\* \* \* \* \*